United States Patent
Kim

(12) 
(10) Patent No.: US 6,292,450 B1
(45) Date of Patent: Sep. 18, 2001

(54) METHOD OF AUTOMATICALLY CONTROLLING BANDWIDTH OF WAVEFORM EQUALIZER

(75) Inventor: Nark-Seog Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/066,895

(22) Filed: Apr. 28, 1998

(30) Foreign Application Priority Data

May 9, 1997 (KR) .................................................. 97-17843

(51) Int. Cl.$^7$ .................................................. G11B 20/24
(52) U.S. Cl. .................................... 369/53.35; 369/59.23; 360/153
(58) Field of Search ................................ 386/21, 40, 45, 386/113, 116, 124, 126; 360/53, 65; 369/54, 59, 124.13, 53; 365/59.23

(56) References Cited

U.S. PATENT DOCUMENTS

| | | | |
|---|---|---|---|
| 5,533,031 | | 7/1996 | Dounn et al. . |
| 5,610,776 | | 3/1997 | Oh . |
| 5,625,509 | * | 4/1997 | Dovek et al. ........................... 360/53 |
| 5,719,843 | * | 2/1998 | Nakajima et al. ...................... 369/59 |
| 5,721,756 | * | 2/1998 | Liebetreu et al. ..................... 375/344 |
| 5,883,866 | * | 3/1999 | Shimizume et al. ................... 369/59 |
| 5,954,837 | * | 9/1999 | Kim .................................. 360/48 X |

* cited by examiner

Primary Examiner—Aristotelis M. Psitos
(74) Attorney, Agent, or Firm—Staas & Halsey LLP

(57) ABSTRACT

A method of automatically controlling bandwidth of a waveform equalizer in a DVD (Digital Video Disc) reproducing apparatus. The DVD reproducing apparatus includes an RF amplifier having the waveform equalizer of which a bandwidth is determined by a bandwidth control signal, and a digital signal processor for demodulating an EFM signal equalized by the RF amplifier. A system controller of the DVD apparatus checks an error cycle of an error signal received from the digital signal processor for a predetermined count cycle, while varying the bandwidth control signal step by step, so as to calculate an error rate according to the bandwidth control signal. Thereafter, the DVD apparatus outputs the bandwidth control signal having a minimum error rate out of the calculated error rates to the RF amplifier, thereby minimizing an error rate during data reproduction.

18 Claims, 3 Drawing Sheets

METHOD OF AUTOMATICALLY CONTROLLING BANDWIDTH OF WAVEFORM EQUALIZER

BACKGROUND OF THE INVENTION

1. Field of the Invention

The present invention relates to a digital video (or versatile) disk reproducing apparatus, and in particular, to a method of automatically controlling a bandwidth of a waveform equalizer to minimize a data error rate during pulse detection.

2. Description of the Related Art

A digital video (or versatile) disc (hereinafter referred to as a DVD), which is a recording medium for a digital moving picture, can record a digital MEPG2 (Moving Picture Experts Group 2) signal indicative of the digital moving picture which is over 2 hours in duration. A general DVD reproducing apparatus for reproducing the audio and video signals recorded on the DVD has a construction as shown in FIG. 1.

Referring to FIG. 1, a DVD 10 mounted on a driving axle of a spindle motor 12 rotates at a constant speed. A pickup device 14 contained in a deck (not shown) irradiates a laser beam onto the DVD 10 and receives a reflected beam from the DVD 10 to read data recorded on the DVD 10. Further, the pickup device 14 controls rotation and loading of the DVD 10 and transfer of a pickup head (not shown). An RF (Radio Frequency) amplifier 16 amplifies the signal picked up by the pickup device 14 and shapes the amplified signal. A digital signal processor (DSP) 18 demodulates (16-8 demodulation) the signal output from the RF amplifier 16, and performs data PLL (base Locked Loop) by means of synchronous detection, descrambling, error detection, error correction, and track buffer control function.

Specifically, the DSP 18 includes a 16-8 demodulator (not shown) and an error correction circuit (not shown). The 16-8 demodulator detects synchronization for the input data and 16-8 demodulates the input data to store it into a memory (i.e., track buffer) 20. The error correction circuit reads the data stored in the track buffer 20 to correct errors of the read data, and then stores the error-corrected data back into the track buffer 20. Further, the DSP 18 searches the data stored in the track buffer 20 for ID (identification) data representative of a disc position, to provide the ID data to a system controller 22, and descrambles the remaining data to store it into the track buffer 20. At the request of an MPEG2 video decoder 30, the DSP 18 reads and transfers the descrambled data stored in the track buffer 20 to the MPEG2 video decoder 30. The system controller 22 controls an overall operation of the DVD reproducing apparatus. A pickup servo controller 24 performs focusing servo, tracking servo and pickup transfer servo, under the control of the system controller 22. A spindle servo controller 26 controls a rotation number of the spindle motor 12, such that a period of the longest or shortest pit of an EFM (Eight-to-Fourteen Modulated) signal read from the DVD 10 should become a prescribed value. A demultiplexer 28 demultiplexes the signal output from the DSP 18, to transfer a video signal to the MPEG2 video decoder 30 and an audio signal to an AC3/MPEG audio decoder 34, respectively. The video and audio output signals from the video decoder 30 and the audio decoder 34 are transferred to a monitor and a speaker via an NTSC encoder 32 and a digital-to-analog converter (DAC) 36, respectively. A keypad 38 (user interface means) includes a plurality of keys with which the user inputs data or commands. A display 40 displays thereon various state information concerning reproduction of the DVD 10.

The RF amplifier 16 of the DVD reproducing apparatus generally includes an adder (not shown) and a waveform equalizer (not shown). In operation, since the signal picked up by the pickup device 14 is divided into four signals for the focusing servo and grouped into two groups, these signals undergo an I-V (current-to-voltage) conversion and are then converted into a signal of a single group. The EFM signal amplified and shaped at the adder is a 3-14T pulse train, so that the reproduced signal is susceptible to having an error due to interference between adjacent waveforms. Accordingly, there has long been a demand for a device which can reduce bandwidth of the waveform equalizer as narrow as possible in order to minimize the interference and as a result, reduce the error rate during pulse detection. Conventionally, a jitter meter was used to reduce the bandwidth of the waveform equalizer. That is, the conventional apparatus measured the EFM signal equalized at the waveform equalizer by using the jitter meter, to determine the bandwidth of the waveform equalizer. Accordingly, the bandwidth of the waveform equalizer is determined passively, so that the bandwidth is inaccurately determined, thereby increasing the data error rate undesirably.

SUMMARY OF THE INVENTION

It is therefore an object of the present invention to provide a method for automatically controlling bandwidth of a waveform equalizer to minimize a data error rate in a DVD reproducing apparatus.

Additional objects and advantages of the invention will be set forth in part in the description which follows and, in part, will be obvious from the description, or may be learned by practice of the invention.

To achieve the above and other objects, there is provided a method for automatically controlling a bandwidth of a waveform equalizer in a DVD reproducing apparatus. The DVD reproducing apparatus includes an RF amplifier having the waveform equalizer of which the bandwidth is determined by a bandwidth control signal, and a digital signal processor for demodulating an EFM signal equalized by the RF amplifier. The DVD apparatus checks an error cycle of an error signal received from the digital signal processor for a predetermined count cycle, while varying the bandwidth control signal step by step, so as to calculate an error rate according to the bandwidth control signal. Thereafter, the DVD apparatus outputs the bandwidth control signal having a minimum error rate out of the calculated error rates to the RF amplifier, thereby minimizing an error rate during data reproduction.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

A preferred embodiment of the present invention will be described in detail hereinbelow with reference to the accompanying drawings. For a comprehensive understanding of the present invention, the present invention will be illustratively described, confined to the specific embodiment. However, it should be noted that the present invention can be implemented by anyone skilled in the art with the description, not the details. In the following description, well-known functions or constructions which may obscure the present invention in unnecessary detail are not described in detail.

Figure 1:
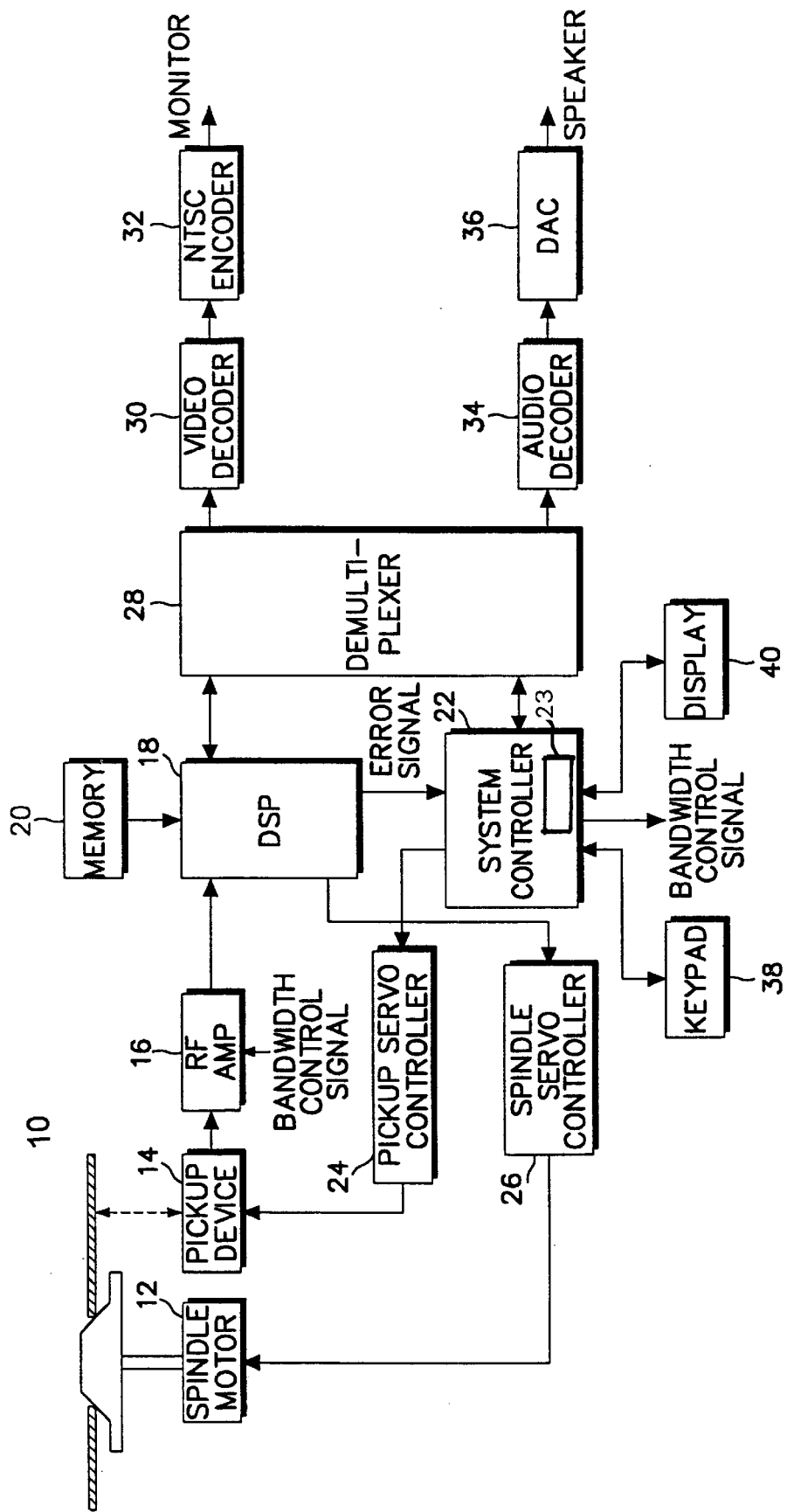
FIG. 1 is block diagram of a conventional DVD reproducing apparatus.
Figure 2:
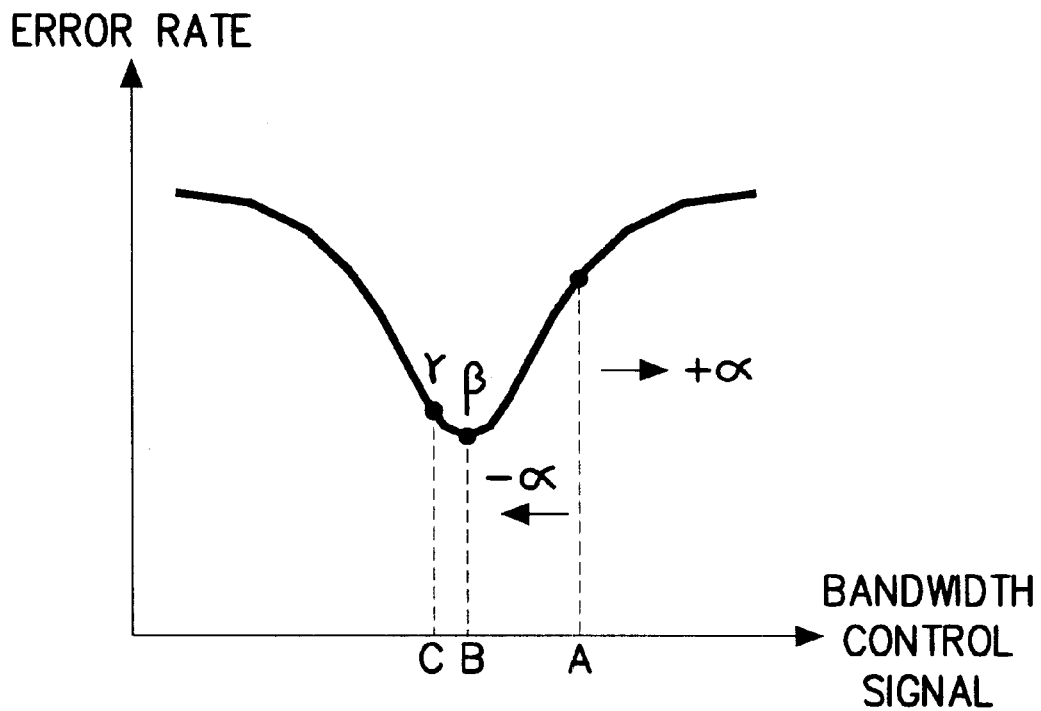
FIG. 2 is an error rate characteristic curve with respect to a bandwidth control signal according to an embodiment of the present invention.
Figure 3:
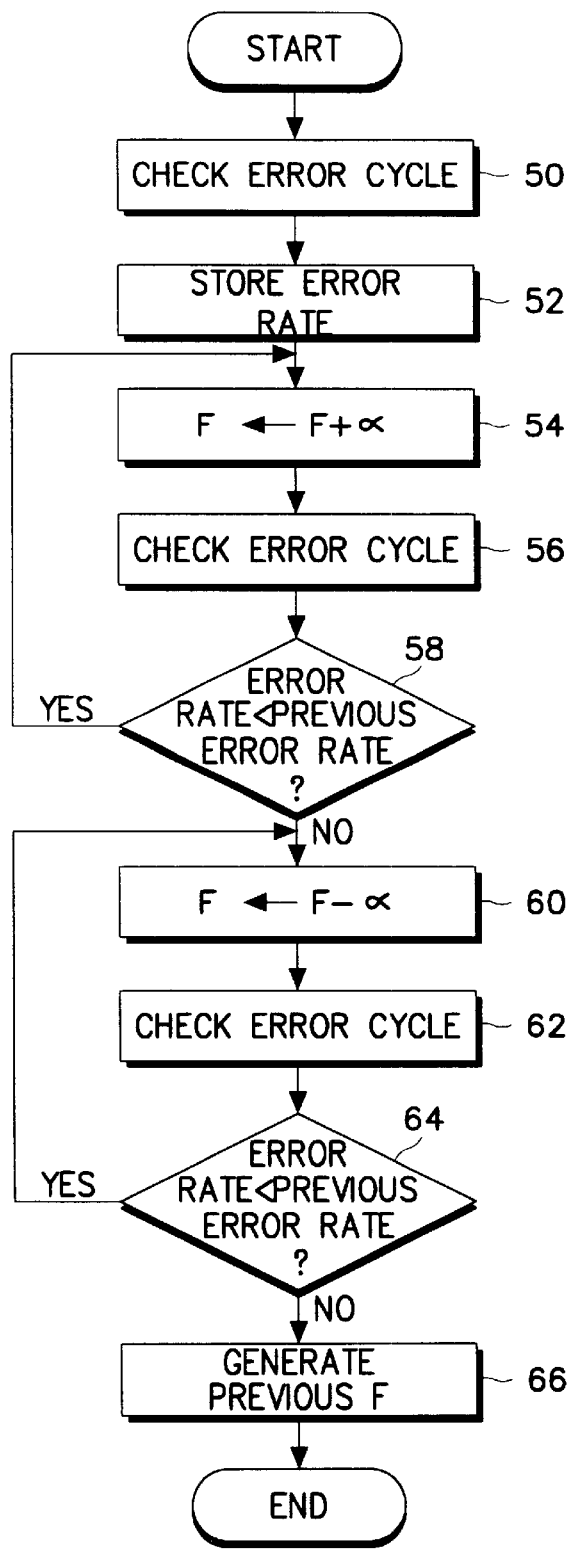
FIG. 3 is a flow chart for searching for a bandwidth control signal having a minimum error rate according to the embodiment of the present invention.

FIG. 2 shows an error rate characteristic curve with respect to a bandwidth control signal according to an embodiment of the present invention, and FIG. 3 shows a flow chart of the system controller 22, for searching for a bandwidth control signal having a minimum error rate according to the embodiment of the present invention. With reference to FIG. 1, upon receiving an error signal from the DSP 18, the system controller 22 counts an error cycle $E_\Gamma$ of the error signal for a predetermined count cycle T to calculate an error rate ($E_\Gamma/T$). The system controller 22 outputs a bandwidth control signal for minimizing the error rate to the RF amplifier 16. In FIG. 2, the X-axis represents the bandwidth control signal F generated from the system controller 22, and the Y-axis represents the error rate value which varies depending on the bandwidth control signal F. The error signal mentioned above refers to a signal generated after the error correction, and the error cycle $E_\Gamma$ represents a time for sustaining the active state.

Now, referring to FIG. 3, description will be made on how the system controller 22 determines the bandwidth control signal having the minimum error rate according to the embodiment of the present invention.

First, at step 50, the system controller 22 checks the error cycle $E_\Gamma$, at a certain point, for example, at a point A of the bandwidth control signal F. The system controller 22 checks the error cycle $E_\Gamma$ for a predetermined count cycle T, to calculate the corresponding error rate. The calculated error rate is stored into an internal memory 23 as an initial error rate, at step 52. Thereafter, the system controller 22 increases the bandwidth control signal F by α, at step 54 and checks again the error cycle $E_\Gamma$ to calculate the corresponding error rate, at step 56. After calculating the error rate, the system controller 22 compares the current error rate calculated at the step 56 with the previous error rate stored in the internal memory 23. As a result, if the current error rate is lower than the previous error rate, the system controller 22 returns to the step 54 to increase again the bandwidth control signal F by α and calculate the corresponding error rate.

However, as shown in FIG. 2, if the current error rate is higher than the previous error rate, the system controller 22 proceeds to step 60 to decrease the bandwidth control signal F by α. After decreasing the bandwidth control signal F, the system controller 22 checks the error cycle and calculates the error rate according thereto, at step 62. Thereafter, the system controller 22 compares again the current error rate calculated at the step 62 with the previous error rate calculated at the step 56. If the current error rate is lower than the previous error rate, the system controller 22 returns to the step 60 to decrease again the bandwidth control signal F by α and calculate the corresponding error rate. However, as shown in FIG. 2, if the current error rate γ is higher than the previous error rate β, the system controller 22 decides that the previous error rate β calculated at the point B is the minimum error rate. Thus, at step 66, the system controller 22 generates the bandwidth control signal F of the previous point B to the RF amplifier 16. In this manner, the system controller 22 can automatically control the bandwidth of the waveform equalizer. As a result, it is possible to minimize the interference between adjacent waveforms generated from the DVD 10, thereby minimizing the error rate during pulse detection.

As described above, the present invention measures the error rate while varying the bandwidth of the waveform equalizer, to determine the bandwidth of the waveform equalizer at the point having the minimum error rate. Therefore, it is possible to minimize the data error rate due to jitter.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of automatically controlling bandwidth of a waveform equalizer in an optical disc reproducing apparatus including an RF (Radio Frequency) amplifier to amplify and equalize an EFM (Eight-Fourteen Modulated) signal read from an optical disc by an optical pickup, the RF amplifier having the waveform equalizer of which the bandwidth is determined by a bandwidth control signal, the optical disc reproducing apparatus further including a digital signal processor to demodulate the EFM (Eight-Fourteen Modulated) signal amplified and equalized by the RF amplifier and to perform data PLL (Phase Locked Loop) by synchronous detection, descrambling, error detection, error correction and track buffering function, said method comprising:

checking error cycles of an error signal received from the digital signal processor for respective predetermined count cycles, while varying the bandwidth control signal so as to calculate decreasing respective error rates according to the bandwidth control signal; and outputting the bandwidth control signal having a minimum error rate out of the calculated error rates to said RF amplifier, to minimize an error rate during data reproduction of the optical disc.

2. The method as claimed in claim 1, wherein said checking error cycles comprises varying the bandwidth control signal in a series of steps.

3. The method as claimed in claim 1, wherein said checking error cycles comprises varying the bandwidth control signal by predetermined amounts between each count cycle.

4. A method of automatically controlling bandwidth of a waveform equalizer in an optical disc reproducing apparatus including an RF (Radio Frequency) amplifier to amplify and equalize an EFM (Eight-Fourteen Modulated) signal read from an optical disc by an optical pickup, the RF amplifier having the waveform equalizer of which the bandwidth is determined by a bandwidth control signal, the optical disc reproducing apparatus further including a digital signal processor to demodulate the EFM signal amplified and equalized by the RF amplifier and performing data PLL (Phase Locked Loop) by synchronous detection, descrambling, error detection, error correction and track buffering function, said method comprising:

checking an error cycle of an error signal received from the digital signal processor for a predetermined count cycle at a previous bandwidth;

changing the previous bandwidth to a current bandwidth, such that an error rate at the current bandwidth is lower than an error rate at the previous bandwidth, and checking the error cycle of the error signal received from said digital signal processor for the predetermined count cycle at the respective bandwidth so as to calculate the corresponding error rate; and if the error rate calculated at the current bandwidth is higher than the error rate calculated at the previous bandwidth, generating the bandwidth control signal for the previous bandwidth to said RF amplifier, to minimize the error rate during data reproduction.

5. A method of automatically controlling bandwidth of a waveform equalizer in an optical disc reproducing apparatus including an RF (Radio Frequency) amplifier to amplify and equalized an EFM (Eight-Fourteen Modulated) signal read from an optical disc, the RF amplifier having the waveform equalizer of which the bandwidth is determined by a bandwidth control signal, the optical disc reproducing device further including a digital signal processor to demodulate the EFM signal amplified and equalized by the RF amplifier and performing data PLL (Phase Locked Loop) to generate an error signal, said method comprising:

checking error cycles of the error signal for respective predetermined count cycles, to determine respective error rates; and varying the bandwidth control signal output to the waveform equalizer based upon the respective error rates, to minimize an error rate during data reproduction of the optical disc.

6. The method as claimed in claim 5, wherein said checking error cycles and said varying the bandwidth control signal comprise:

comparing a particular error rate with a next error rate;

varying an amplitude of the bandwidth control signal in a given direction if the next error rate is greater than the particular error rate; and repeating the comparing the particular error rate and the varying an amplitude of the bandwidth for subsequent error cycles until the next error rate is less than the particular error rate.

7. The method as claimed in claim 6, wherein the varying an amplitude of the bandwidth control signal comprises incrementing the amplitude of the bandwidth control signal by a predetermined amount if the next error rate is less than the particular error rate.

8. The method as claimed in claim 6, wherein the varying an amplitude of the bandwidth control signal comprises decrementing the amplitude of the bandwidth control signal by a predetermined amount if the next error rate is greater than the particular error rate.

9. The method as claimed in claim 5, wherein said checking error cycles and said varying the bandwidth control signal comprise:

comparing a particular error rate with a next error rate;

varying an amplitude of the bandwidth control signal in a first direction if the next error rate is greater than the particular error rate; and repeating the comparing the particular error rate and the varying an amplitude of the bandwidth control signal for subsequent error cycles until the next error rate is less than the particular error rate;

if the next error rate is less than the particular error rate, then varying the amplitude of the bandwidth control signal in a second direction opposite the first direction and comparing the next error rate with the particular error rate for subsequent error cycles; and repeating the varying the amplitude of the bandwidth control signal in the second direction and comparing the next error rate with the particular error rate for subsequent cycles until the next error rate is less than the particular error rate.

10. The method as claimed in claim 9, wherein the first direction is a decrementing of the amplitude of the bandwidth control signal and the second direction is an incrementing of the amplitude of the bandwidth control signal.

11. The method as claimed in claim 10, wherein the incrementing is performed by a predetermined fixed amount, and the decrementing is performed by the predetermined fixed amount.

12. A computer readable medium encoded with processing instructions for implementing a method of automatically controlling bandwidth of a waveform equalizer, in an optical disc reproducing apparatus to determine a minimum data error rate from calculated error signals that is performed by a computer, the method comprising:

checking error cycles of the received error signal for respective predetermined count cycles, to determine respective error rates; and varying the bandwidth control signal output to the waveform equalizer based upon the respective error rates, to minimize an error rate during data reproduction of the optical disc.

13. The computer readable medium of claim 12, wherein said checking error cycles and said varying the bandwidth control signal comprise:

comparing a particular error rate with a next error rate;

varying an amplitude of the bandwidth control signal in a given direction if the next error rate is greater than the particular error rate; and repeating the comparing the particular error rate and the varying an amplitude of the bandwidth for subsequent error cycles until the next error rate is less than the particular error rate.

14. The computer readable medium of claim 13, wherein the varying an amplitude of the bandwidth control signal comprises incrementing the amplitude of the bandwidth control signal by a predetermined amount if the next error rate is less than the particular error rate.

15. The computer readable medium of claim 13, wherein the varying an amplitude of the bandwidth control signal comprises decrementing the amplitude of the bandwidth control signal by a predetermined amount if the next error rate is greater than the particular error rate.

16. The computer readable medium of claim 12, wherein said checking error cycles and said varying the bandwidth control signal comprise:

comparing a particular error rate with a next error rate;

varying an amplitude of the bandwidth control signal in a first direction if the next error rate is greater than the particular error rate; and repeating the comparing the particular error rate and the varying an amplitude of the bandwidth control signal for subsequent error cycles until the next error rate is less than the particular error rate;

if the next error rate is less than the particular error rate, then varying the amplitude of the bandwidth control signal in a second direction opposite the first direction and comparing the next error rate with the particular error rate for subsequent error cycles; and repeating the varying the amplitude of the bandwidth control signal in the second direction and the comparing the next error rate with the particular error rate for subsequent cycles until the next error rate is less than the particular error rate.

17. The computer readable medium of claim 16, wherein the first direction is a decrementing of the amplitude of the bandwidth control signal and the second direction is an incrementing of the amplitude of the bandwidth control signal.

18. The computer readable medium of claim 17, wherein the incrementing is performed by a predetermined fixed amount, and the decrementing is performed by the predetermined fixed amount.

* * * * *